(Model.)

S. MACFARLANE.
INJECTOR.

No. 307,967. Patented Nov. 11, 1884.

Witnesses:
Jas. E. Hutchinson.
Henry C. Hazard.

Inventor.
Stewart Macfarlane
by Prindle and Russell
Attorneys.

United States Patent Office.

STEWART MACFARLANE, OF DRIFTON, PENNSYLVANIA.

INJECTOR.

SPECIFICATION forming part of Letters Patent No. 307,967, dated November 11, 1884.

Application filed June 24, 1884. (Model.)

*To all whom it may concern:*

Be it known that I, STEWART MACFARLANE, of Drifton, in the county of Luzerne, and in the State of Pennsylvania, have invented certain new and useful Improvements in Injectors; and I do hereby declare that the following is a full, clear, and exact description thereof, reference being had to the accompanying drawings, in which—

Figure 1:
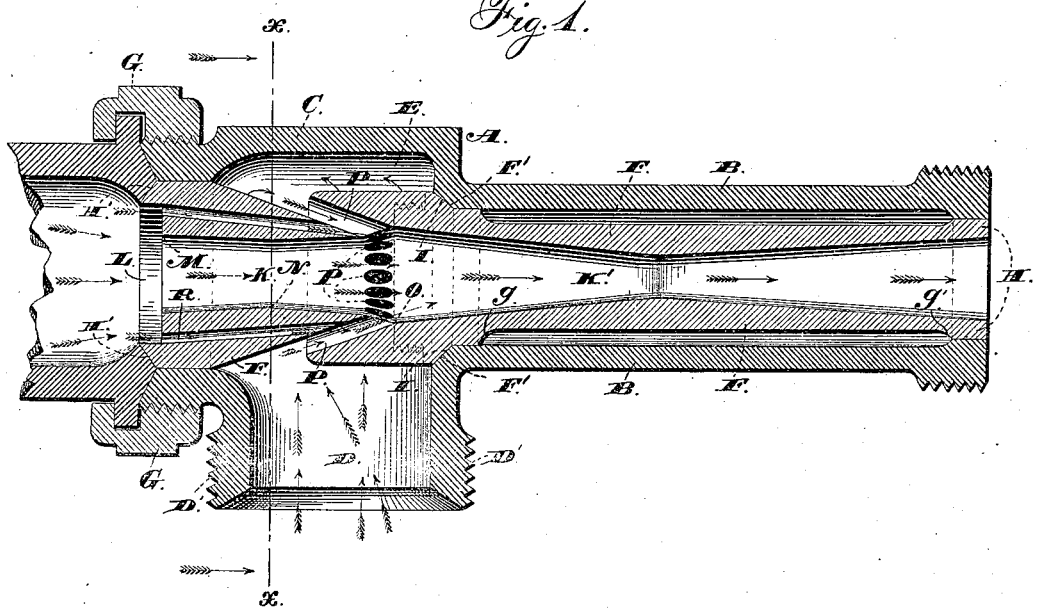
Figure 2:
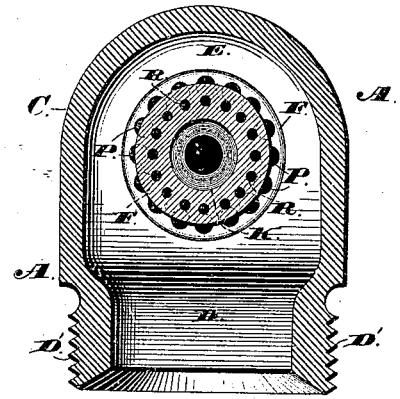

Figure 1 shows a vertical axial section of my injector, and Fig. 2 a vertical transverse section of the same on line $x$ $x$.

Letters of like name and kind refer to like parts in each of the figures.

The object of my invention is to provide an improved injector; and to this end it consists in the construction, arrangement, and combination of parts, as hereinafter described, and more specifically pointed out in the claims.

In the drawings, A designates the casing of my injector, preferably made of iron. As shown, this casing consists of the hollow cylindrical part B, provided at one end with a screw-threaded portion for coupling and of the enlarged portion C at the other end of the cylindrical part B. At the lower side of enlargement C is the tubular extension D, screw-threaded at D', to enable it to be coupled to a pipe from the water-supply. The internal bore of part C is made larger than that of the cylinder B, to form the water-chamber E around the injector proper, F, to be described. At its outer and rear end the enlarged part C is suitably threaded to receive a coupling, G, for connecting with a steam-supply. The bore within the casing is at this end cylindrical, and smaller than the enlarged bore forming the chamber E, but is, as shown, larger than the bore of the cylindrical part B. Where the bore of this part B opens into the chamber the casing is beveled inward and forward to form the bevel-shoulder F' F'. Such beveling is not necessary, for a square shoulder might be formed to serve the same purpose as this.

Fitting within casing A is the brass piece F, forming the injector proper. This piece is bored from end to end to form a tubular core, as shown. Its front end, H, fits the cylindrical bore of the casing, as shown. At I it is formed with a beveled shoulder fitting and bearing against the beveled sides of the portion F' of the casing. Beyond this part it fits the bore of the cylindrical part B for a short distance, is then a little reduced in size, and at its outer and forward end is again enlarged to fit the casing-bore, which, as shown, is slightly contracted at that point. With this construction the brass piece or tubular core F, being in one piece, can obviously be readily taken out at the rear side of the casing and replaced, as desired. The reduction in size of this core from the point $g$ to $g'$ within the cylindrical part B of the casing is not necessary; but I prefer to so reduce it. The extreme rear end of the core F is beveled rearward and inward, to fit within the correspondingly-beveled end, H', of the coupled steam-pipe. When, then, the pipe is coupled to the injector-casing, the core is held firmly in place within the casing, but can be removed when the pipe is uncoupled again. The tubular core F, forming the injector proper, is, as shown, bored from end to end in such a manner as to form the steam-passage K, the combining-passage K', and the discharge-passage at the end of the core. At the extreme rear end the steam-passage is preferably cylindrical for a short distance at L, and then is contracted suddenly at M, from which point it gradually contracts further to the point N. From this latter point it increases in size to the point O in the rear of the plane of the end of the enlarged part C of casing. From here it contracts, and then enlarges again, as does the passage in the ordinary injectors.

Extending through the sides of the hollow core from the water-chamber E is the series of openings or passages P P. As shown, these passages converge forward and enter the main bore or passage K' at the enlargement of the bore at the point O. With this construction, if steam should be admitted to flow through the passage K', water would be drawn inward into such passage through the openings or passages P P and driven forward as it is drawn in through the water-opening and driven forward in the injectors heretofore in use. To aid this drawing and forcing action of the steam, I make a series of passages, R R, from the enlarged portion L of the steam-passage, opening at their forward ends into the water-passages P P. As shown, these steam-passages meet and open into those for the steam at acute angles, so that the steam will strike, mingle with, and drive forward the water into the main passage K', where it will be struck and acted upon by the main body of steam.

As indicated in dotted lines, the injector-core F can be made, if desired, in two pieces screwed together. It can be so made to facilitate the boring of the various passages; but I contemplate making it in one piece. In my injector as constructed there is no adjustment to be made and nothing to get out of order.

As indicated hereinbefore, by simply unscrewing the coupling at the rear end of the injector, the whole brass piece within can be taken out and replaced.

In practice I find that a very small injector made as mine is will do a great deal of work, and that by simply boring the brass core or injector proper to a larger or smaller diameter the injector can be adapted for use with almost any number of boilers, even more than eighteen. If the injector is put up for six boilers, it is only necessary to take out one piece of brass and put in another bored out a little larger to fit the injector for use with a larger number of boilers. One of my injectors has been now for some time working successfully in feeding eighteen boilers. As the water is allowed to enter the main passage K in a series of jets the steam can take hold of it better and more strongly than where it enters the passage in one stream.

The application of a small steam-jet to each of the water-passages as shown and described makes a series of injectors discharging a series of small streams into the passage K in the same or nearly the same direction in which the main body of steam acts to drive the body of water coming from the small streams.

Having thus fully set forth the nature of my invention, what I claim is—

1. An injector having the series of water-passages opening from the water-chamber into the combining-passage, and the series of steam-passages opening into the water-passages, so that the steam from such steam-passages will act to force the water into the combining-passage, substantially as and for the purpose described.

2. An injector having a tubular core provided with a combining and a delivery passage, a water-chamber around the core, a series of passages in the core extending from the chamber and opening into the combining-passage, and a series of steam-passages opening into these water-passages at acute angles thereto, substantially as and for the purpose described.

3. An injector provided with a main steam-passage, and a combining and a delivery passage, a series of forwardly-convergent passages extending from the water-chamber to the combining-passage, and a series of steam-passages extending from the main steam-passage and entering the water-passages, so that the steam from them will act on the water to drive it forward into the combining-passage in a series of jets, substantially as described.

4. The tubular core provided with the main steam-passage, the combining-passage, and the delivery-passage, the series of forwardly-convergent water-passages opening into the combining-passage, and the series of steam-passages extending forward from the main steam-passage and opening into the water-passages, in combination with the casing fitting around and inclosing the tubular core, provided with the annular recess adapted to form a water-chamber around the core, and to be connected with the water-supply chamber, substantially as and for the purpose described.

5. The casing formed with the annular enlargement or recess within connected with the water-supply pipe, and adapted to form a water-chamber around the tubular injector-core when it is in place, in combination with the removable tubular core fitting in the casing and provided with steam, combining, and delivery passages, and one or more openings or passages for admitting water from the water-chamber to the combining-passage, and means for holding the core firmly in place when the injector is coupled to the steam-supply pipe, substantially as and for the purpose described.

In testimony that I claim the foregoing I have hereunto set my hand this 20th day of May, A. D. 1884.

STEWART MACFARLANE.

Witnesses:
ECKLEY B. COXE,
ARTHUR MCCLELLAN.